United States Patent Office 3,444,656

Patented May 20, 1969

3,444,656

SELECTIVE CUTTING OF A BODY BY AIR ABRASION

Cyril Francis Drake, Harlow, Essex, Walter Eric Simpson, Great Amswell, Ware, and John Sydney Robinson, Harlow, Essex, England, assignors to International Standard Electric Corporation, New York, N.Y., a corporation of Delaware No Drawing. Filed July 27, 1966, Ser. No. 568,116
Claims priority, application Great Britain, Aug. 6, 1965, 33,808/65
Int. Cl. B24c *1/04*
U.S. Cl. 51—312 8 Claims

ABSTRACT OF THE DISCLOSURE

This is a method of selectively cutting a body consisting of a natural rubber and/or vulcanisable elastomer by air abrasion. The hardness of portions of the body is changed by exposure to radiation and/or heat, so that different portions of the body have different degrees of hardness. The body is then air abraded whereby the harder portions of the body are preferentially removed.

The invention relates to a method of selectively cutting a body by air abrasion.

For the purposes of this specification air abrasion is defined as abrasion by a stream of gas entrained particles.

The invention provides a method for selectively cutting a body by air abrasion and includes the steps of locally modifying the hardness of the material of the body at least in a surface zone, so that different portions of the body surface are of different hardness, and submitting the surface of the body to air abrasion, whereby the harder portions of the surface are preferentially removed.

According to one feature of the invention said body is applied to a surface of a substrate, desired portions of said body being modified in hardness so that on air abrasion of the surface of said body, the harder portions may be removed until exposing desired areas of said substrate, such that said body provides a mask for said substrate.

According to another feature of the invention the hardness of the material is modified by exposure to radiation and/or heat, the extent of change in hardness being dependent on the magnitude and time of exposure.

According to another feature of the invention said body consists of a natural rubber and/or vulcanisable elastomer and contains one or more additives, portions containing said additives being modified in hardness when said portions or body is exposed to radiation and/or heat.

According to another feature of the invention additives which activate an increase in hardness on exposure to radiation and/or heat are vulcanising agents, such as organic peroxides, for example, benzoyl, lauroyl, octanoyl, acetyl and acetyl benzoyl peroxides.

According to another feature of the invention, alumina powder is used as abrasive particles for said method of air abrasion.

According to further features of the invention, a mask for example a negative, is used to expose desired portions of said body to radiation, said radiation being either visible light, ultra violet electron or gamma radiation.

The manufacture of semiconductor devices often involves removal of one or more portions from a surface. A convenient means of removal is air abrasion since the abrasive particles do very little damage to the surface so that only a light cleaning etch, if any, is necessary before subsequent operations. The present invention may be applied to provide a mask, prepared and located easily and accurately for profiling a surface by air abrasion, and consequently has application for the manufacture of semiconductor devices. The foregoing and other features according to this invention will be understood by reference to the following example in which a mask is formed so that desired sections may be removed from a semiconductor device.

A solution of natural or synthetic rubber in a petroleum mixture is compounded with 1% by weight of benzoyl peroxide and the mix is applied to the surface of a silicon body by spraying to a thickness of about 5 thousandths. The solvent is allowed to evaporate in air at room temperature and the resulting coating is exposed through a masking negative to ultraviolet radiation for fifteen minutes whereby the exposed portions of coating are vulcanised and become hard. These hard portions are removed together with the desired thickness of underlying silicon by air abrasion using alumina powder, whilst the unexposed and unvulcanised portions remain soft and resistant to air abrasion and are removed by soaking in trichloroethylene, agitating for about ten minutes.

Alternatively lauroyl, octanoyl, acetyl or acetyl benzoyl peroxides may be used as culcanising agents, the activity of each varying exponentially with the percentage by weight present, activity generally approaching maximum when 10% by weight of vulcanising agent is present.

While the invention has been described as applied to profiling a semiconductor device it will be apparent that the invention has applications to other processes which involve masking or masking and cutting by air abrasion, for example the invention affords a method whereby natural or synthetic rubber may be easily cut. Desired sections, treated with a vulcanising agent are hardened on exposure to radiation and may be cut by air abrasion. The invention can be applied to the decoration of plastics and glassware where in such cases a mask may be applied as aforesaid so that desired sections of plastic or glass may be removed by air abrasion to form a pattern. Similarly sections can be removed from layers of multilayer constructions and, where each layer is different in colour, a coloured pattern may be produced.

The invention may be used for the production of charge patterns. A material normally of high surface resistivity is given an electrical charge over selected areas, applied, for example by irradiating with low energy electrons or by illuminating with ultraviolet light. The vulcanising agent in fine powder or liquid form is applied to the surface and is attracted only to the charged regions, so that on exposing the whole surface to active radiation the areas on which the vulcanising agent has been deposited will become hardened and may be removed as hereinbefore described so forming a charge pattern.

A further application of the invention is providing masks for electroplating, where it may be necessary to electroplate small and district areas.

It is to be understood that the foregoing description of specific examples of this invention is made by way of example only and is not to be considered as a limitation on its scope.

What we claim is:

1. A method for abrading a body comprising a substance and a vulcanizing agent, said substance being selected from the group consisting of natural rubber and vulcanizable resilient elastomers, said vulcanizing agent being capable of increasing the hardness of said body upon exposure of particular radiation comprising the steps of:

irradiating selected portions of said body with said particular radiation to increase the hardness thereof; and subjecting said body to a stream of abrasive particles such that said selected portions are abraded at a rate substantially different from the rate of abrasion of unselected portions of said body.

2. A method according to claim 1 wherein said body is applied to a surface of a substrate, said selected portions being removed to expose desired areas of said substrate such that said body provides a mask for said substrate.

3. A method according to claim 1 wherein said vulcanizing agent contains at least one organic peroxide.

4. A method according to claim 3 wherein said peroxide is selected from a group consisting of benzoyl, lauroyl, octanoyl, acetyl and acetyl benzoyl peroxide.

5. A method for abrading a body comprising a substance and a vulcanizing agent, said substance being selected from the group consisting of natural rubber and vulcanizable resilient elastomers, said vulcanizing agent being capable of increasing the hardness of said body upon exposure to particular excitation, comprising the steps of:

subjecting selected portions of said body to said excitation to harden said selected portions; and subjecting said body to a stream of abrasive particles such that said selected portions are abraded at a rate substantially different from the rate of abrasion of unselected portions of said body.

6. A method according to claim 5 wherein said body is applied to a surface of substrate, said selected portions being removed to expose desired areas of said substrate such that said body provides a mask for said substrate.

7. A method according to claim 5 wherein said vulcanizing agent contains at least one organic peroxide.

8. A method according to claim 7 wherein said peroxide is selected from consisting of benzoyl, lauroyl, octanoyl, acetyl and acetyl benzoyl peroxide.

References Cited

UNITED STATES PATENTS

| | | | |
|---|---|---|---|
| 1,410,721 | 3/1922 | Rizzon et al. | 51—311 |
| 1,784,495 | 12/1930 | O'Neil | 51—311 |
| 2,156,696 | 5/1939 | Knox | 51—312 |
| 2,996,846 | 8/1961 | Leliaert | 51—320 X |
| 3,110,983 | 11/1963 | Moore | 51—13 X |

LESTER M. SWINGLE, *Primary Examiner.*

U.S. Cl. X.R.

51—320